(12) United States Patent
Nakamikawa et al.

(10) Patent No.: US 6,777,073 B2
(45) Date of Patent: Aug. 17, 2004

(54) MAGNETIC RECORDING MEDIUM

(75) Inventors: Junichi Nakamikawa, Kanagawa-ken (JP); Masakazu Nishikawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 8 days.

(21) Appl. No.: 10/354,001

(22) Filed: Jan. 30, 2003

(65) Prior Publication Data

US 2003/0143432 A1 Jul. 31, 2003

(30) Foreign Application Priority Data

Jan. 30, 2002 (JP) ........................................ 2002-021355

(51) Int. Cl.$^7$ ................................................. G11B 5/66
(52) U.S. Cl. ............................. 428/323; 428/694 BH; 360/16
(58) Field of Search ..................... 428/323, 694 BH; 360/16

(56) References Cited

U.S. PATENT DOCUMENTS

| | | |
|---|---|---|
| 5,981,054 A | 11/1999 | Hikosaka et al. |
| 6,080,476 A | 6/2000 | Kanbe et al. |
| 6,347,016 B1 | 2/2002 | Ishida et al. |
| 2002/0009619 A1 | 1/2002 | Sakawaki et al. |

FOREIGN PATENT DOCUMENTS

| | | |
|---|---|---|
| EP | 0 865 034 A1 | 9/1998 |
| EP | 1 128 363 A2 | 8/2001 |
| GB | 2 064 371 A | 6/1981 |
| JP | 63-183623 | 7/1988 |
| JP | 2001-14467 | 1/2001 |

Primary Examiner—Stevan A. Resan
(74) Attorney, Agent, or Firm—Sughrue Mion, PLLC

(57) ABSTRACT

A flexible magnetic recording medium includes a non-magnetic layer and a magnetic layer consisting of ferromagnetic powder dispersed in binder which are formed on a base sheet in this order. The ferromagnetic powder is not smaller than 158 kA/m in coercive force Hc(VSM) as measured by a vibrating sample magnetometer and is not larger than 100 in KuV/kT (wherein Ku represents an anisotropy constant, V represents a volume, k represents a Boltzmann constant and T represents an absolute temperature) which is a parameter of thermal fluctuation, and a magnetization pattern representing predetermined information has been formed on the magnetic layer by magnetic transfer.

4 Claims, 3 Drawing Sheets

MAGNETIC RECORDING MEDIUM

BACKGROUND OF THE INVENTION

1. Field of the Invention

Figure 1:
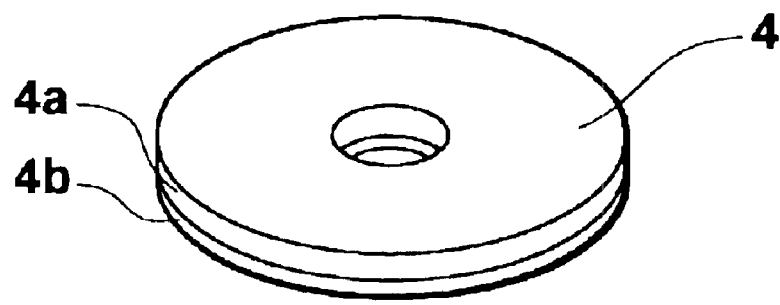
Figure 1:
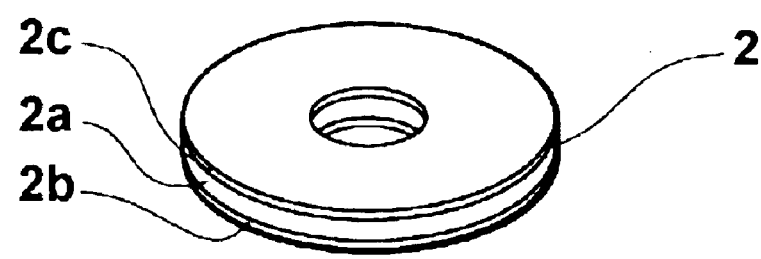
Figure 1:
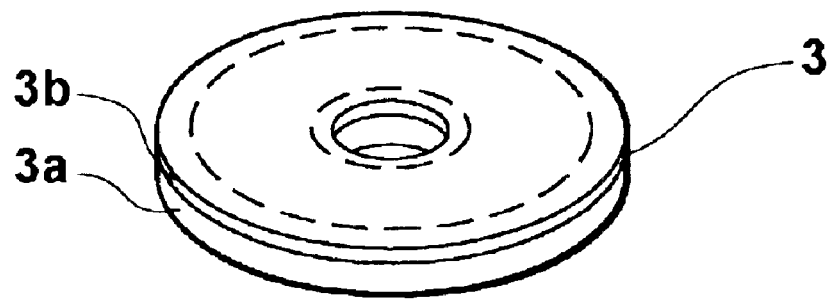

This invention relates to a magnetic recording medium on which a magnetization pattern is formed by magnetic transfer.

2. Description of the Related Art

With an increase in information quantity, there has been a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc or a ZIP (Iomega) in the form of a flexible disc. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At present, such preformat recording is performed by the use of a specialized servo recording apparatus (a servo track writer) However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication No. 63(1988)-183623, and U.S. Pat. No. 6,347,016, a magnetic transfer method in which a pattern which is formed on a master information carrier and represents servo information is copied to a magnetic recording medium (a slave medium) by magnetic transfer.

In the magnetic transfer, the magnetization pattern representing the information (e.g., servo information) carried by a master information carrier is magnetically transferred from the master information carrier to a slave medium by applying a transfer magnetic field to the slave medium and the master information in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

U.S. Pat. No. 6,347,016 discloses a magnetic transfer method using a patterned master having thereon an irregularity pattern (a pattern of protruding portions and recessed portions) representing information to be transferred. Further, we have proposed, in our Japanese Unexamined Patent Publication No. 2001-14467, a magnetic transfer method in which a soft magnetic layer small in coercive force is formed on the surface of the protruding portions of the substrate of the master information carrier, the magnetic layer of the slave medium is DC-magnetized in one direction of the recording tracks and a transfer magnetic layer is applied to the slave medium in the direction opposite to the direction of the DC-magnetization with the magnetic layer of the slave medium held in close contact with the soft magnetic layer of the master information carrier.

In order to realize a high density recording, it is necessary to reduce the particle volume of the magnetic material. However, as the particle volume of the magnetic material becomes smaller, it becomes impossible for a magnetic head to record a high frequency signal on a recording medium in saturation recording.

Though a data signal can be detected by signal processing such as PRML even if it is not recorded in saturation recording, there is a strong probability that a servo signal becomes undetectable if it is not recorded in saturation recording.

SUMMARY OF THE INVENTION

In view of the foregoing observations and description, the primary object of the present invention is to provide an inexpensive magnetic recording medium by recording a signal in saturation recording on a magnetic recording medium.

Another object of the present invention is to provide an inexpensive magnetic recording medium for distribution by recording not only a servo signal but a data signal on a magnetic recording medium.

In accordance with the present invention, there is provided a flexible magnetic recording medium comprising a non-magnetic layer and a magnetic layer consisting of ferromagnetic powder dispersed in binder which are formed on a base sheet in this order, wherein the improvement comprises that the ferromagnetic powder is not smaller than 158 kA/m (about 2000 Oe) in coercive force Hc(VSM) as measured by a vibrating sample magnetometer and is not larger than 100 in KuV/kT (wherein Ku represents an anisotropy constant, V represents a volume, k represents a Boltzmann constant and T represents an absolute temperature) which is a parameter of thermal fluctuation, and a magnetization pattern representing predetermined information has been formed on the magnetic layer by magnetic transfer.

It is preferred that the ferromagnetic powder be ferromagnetic metal powder or ferromagnetic hexagonal ferrite powder.

When the ferromagnetic powder is not smaller than 278 kA/m in coercive force Hc(VSM) as measured by a vibrating sample magnetometer, the magnetic recording medium is especially suitable as a read-only recording medium.

The coercive force Hc as measured by a vibrating sample magnetometer means a value obtained through measurement near the value for an observed time of 10 seconds.

It is preferred that the magnetic layer be not larger than 3 nm in center plane mean roughness.

Further it is preferred that the magnetic layer be not larger than $5 \times 10^{-2}$ T·$\mu$m in $\phi$m (magnetic flux density×thickness of the magnetic layer).

Further it is preferred that the ferromagnetic powder be not larger than $1 \times 10^{-17}$ cm$^3$ in volume.

Further, it is preferred that the ferromagnetic powder be not smaller than $1 \times 10^4$ J/m$^3$ in anisotropy constant Ku.

The "non-magnetic layer" need not be completely non-magnetic so long as it is substantially non-magnetic and the magnetism thereof is sufficiently weak as compared with the magnetic layer consisting of ferromagnetic powder dispersed in binder.

It is preferred that the magnetization pattern representing predetermined information be formed on the magnetic layer by magnetic transfer in which a transfer magnetic field is applied to the magnetic recording medium in close contact with a master information carrier provided thereon a magnetic layer pattern representing the predetermined information so that a magnetization pattern corresponding to the magnetic layer pattern is formed on the magnetic layer of the magnetic recording medium. The "magnetic layer pattern representing the predetermined information" may comprise, for instance, a substrate having an irregularity pattern formed on the surface thereof and magnetic layers formed at least on protruding portions of the irregularity pattern on the substrate, a substrate having an irregularity pattern formed on the surface thereof and magnetic layers embedded in recessed portions of the irregularity pattern on the substrate, and a flat substrate and magnetic layers formed in a pattern on the flat substrate. That is, the master information carrier is so-called a patterned master information carrier which bears thereon information not as a magnetization pattern but as a magnetic layer pattern. As the magnetic layers of the master information carrier, soft magnetic layers are optimal.

The "predetermined information" may be, for instance, a servo signal.

When the ferromagnetic powder of the magnetic layer is not smaller than 158 kA/m (about 2000 Oe) in coercive force Hc(VSM) as measured by a vibrating sample magnetometer and is not larger than 100 in KuV/kT which is a parameter of thermal fluctuation, the effective coercive force of the magnetic layer at the signal frequency is increased so that saturation recording of signals by the normal magnetic head become impossible. Whereas, since recording is statically effected in magnetic transfer, signals can be recorded in saturation recording by magnetic transfer.

As disclosed in "IEEE TRANS. ON MAG-17, No. 6, November 1981, pp3020 to 3020", magnetization-inversion-time-dependency of coercive force Hc is represented by the following formula.

$$Hc(\tau) = \frac{2Ku}{Ms} \times \left[1 - \sqrt{\frac{kT}{KuV} \times \ln\left(\frac{A\tau}{0.693}\right)}\right]$$

Since the coercive force Hc as measured by a vibrating sample magnetometer (VSM) is a value obtained through measurement near the value for an observed time of 10 seconds, the magnetization-inversion-time-dependency of coercive force Hc is standardized by Hc(VSM) as follows.

$$Hc(\tau)\big/Hc(VSM) = \left[1 - \sqrt{\frac{kT}{KuV} \times \ln\left(\frac{A\tau}{0.693}\right)}\right] \Big/ \left[1 - \sqrt{\frac{kT}{KuV} \times \ln\left(\frac{A \cdot 10}{0.693}\right)}\right]$$

wherein Ku represents an anisotropy constant, Ms represents saturation magnetization, k represents a Boltzmann constant ($1.38 \times 10^{-16}$ erg/K), T represents an absolute temperature, V represents a volume, A represents a spin precessional frequency ($2 \times 10^9$/sec) and $\tau$ represents the magnetization inversion time.

For example, when the absolute temperature T=300K and KuV/kT=75, 100, 150 and 200, change of Hc($\tau$)/Hc(VSM) with $\tau$ is as shown in the following table 1.

Figure 3:
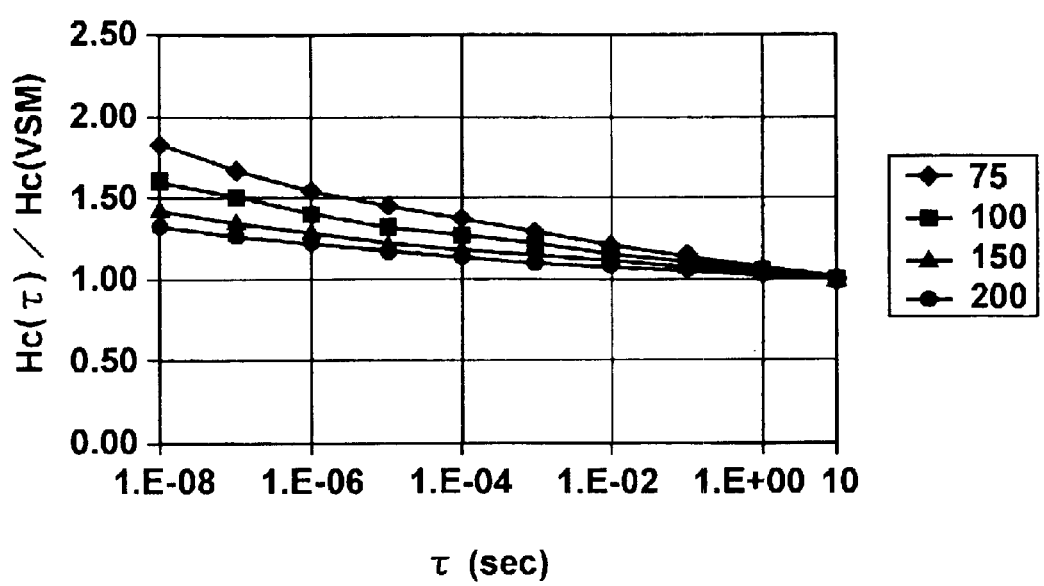

The table 1 is graphed as FIG. 3. As can be seen from FIG. 3, the effective coercive force increases as the $\tau$ becomes smaller. Further, for a given $\tau$, the effective coercive force increases as KuV/kT becomes smaller. Especially, when KuV/kT is not larger than 100, the magnetization-inversion-time-dependency of the effective coercive force Hc is large and the effective coercive force becomes not smaller than 1.5 times Hc(VSM) in the magnetization inversion time, $1 \times 10^{-7}$ to $1 \times 10^{-8}$, at the current signal frequency at which the normal magnetic head writes and erases. Accordingly, when the coercive force Hc(VSM) of the ferromagnetic powder of the magnetic layer is not smaller than 158 kA/m and KuV/kT is not larger than 100, the effective coercive force of the magnetic layer becomes too large for the normal magnetic head to write on the magnetic recording medium in saturation recording. That is, though saturation recording on the magnetic recording medium by the current magnetic head technology is impossible, signals can be recorded in saturation recording on the magnetic recording medium by magnetic transfer. Accordingly, a servo signal can be optimally recorded on the magnetic recording medium.

In order to record on the magnetic recording medium at a high density not lower than 1 Gbit/inch$^2$, it is necessary that the magnetic material is fine in particle size, the magnetic layer has a smooth surface and the magnetic layer is small in thickness.

When the magnetic layer surface is rough, the S/N deteriorates due to spacing loss upon recording and/or modulation noise.

When $\phi$m (magnetic flux density×thickness of the magnetic layer) is larger than $5 \times 10^{-2}$ T·$\mu$m, the S/N deteriorates due to output drop caused by self-demagnetization and/or waveform interference.

When the ferromagnetic powder is larger than $1 \times 10^{-17}$ cm$^3$ in volume, noise is increased and the S/N deteriorates.

When the ferromagnetic powder is smaller than $1 \times 10^4$ J/m$^3$ in anisotropy constant Ku, recorded magnetization vanishes and the S/N deteriorates.

BRIEF DECRIPTION OF THE DRAWINGS

Figure 2A:
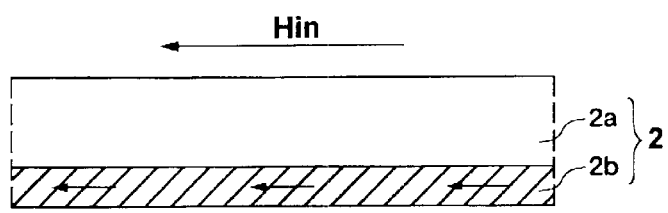
Figure 2B:
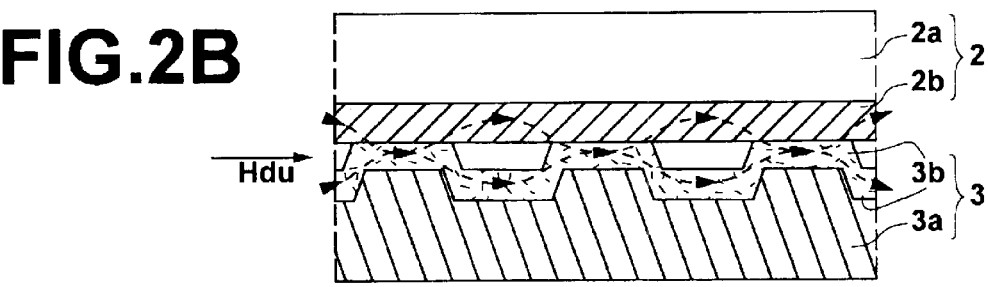
Figure 2C:
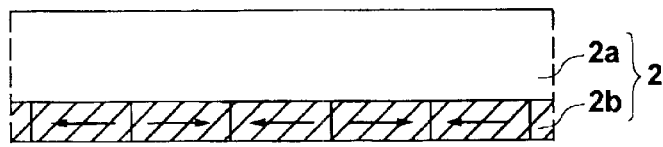

FIG. 1 is an exploded perspective view of a double-sided slave medium and a pair of master information carriers carrying thereon master information to be transferred to opposite sides of the slave medium, FIGS. 2A to 2C are views for illustrating basic steps of magnetic transfer to a magnetic recording medium, and FIG. 3 is a graph representing table 1.

DESCRIPTION OF THE PREFERRED EMBODIMENTS

In FIG. 1, a pair of pieces of information are transferred to opposite sides of a magnetic recording medium 2 in accordance with an embodiment of the present invention from a pair of master information carriers 3 and 4.

The magnetic recording medium 2 is a flexible disc and comprises a disc-like base sheet 2a and magnetic layers 2b and 2c formed on opposite sides of the base sheet 2a. More particularly, a primer layer which is substantially non-

TABLE 1

| | Hc ($\tau$)/Hc (VSM) | | | | | | | | | |
|---|---|---|---|---|---|---|---|---|---|---|
| KuV/kT | 10 | 1 | 1.E–01 | 1.E–02 | 1.E–03 | 1.E–04 | 1.E–05 | 1.E–06 | 1.E–07 | 1.E–08 |
| 75 | 1.00 | 1.06 | 1.13 | 1.20 | 1.28 | 1.36 | 1.45 | 1.56 | 1.67 | 1.82 |
| 100 | 1.00 | 1.05 | 1.10 | 1.15 | 1.21 | 1.27 | 1.33 | 1.41 | 1.50 | 1.60 |
| 150 | 1.00 | 1.03 | 1.07 | 1.10 | 1.14 | 1.19 | 1.23 | 1.28 | 1.34 | 1.42 |
| 200 | 1.00 | 1.03 | 1.05 | 1.08 | 1.11 | 1.15 | 1.18 | 1.23 | 1.27 | 1.33 | magnetic is formed on the base sheet 2a on each side thereof and a magnetic layer 2b, comprising ferromagnetic metal powder or ferromagnetic hexagonal ferrite powder dispersed in binder, is formed on each primer layer. The ferromagnetic metal powder or ferromagnetic hexagonal ferrite powder is not smaller than 158 kA/m (about 2000 Oe) in coercive force Hc(VSM) as measured by a vibrating sample magnetometer and is not larger than 100 in KuV/kT (which is a parameter of thermal fluctuation.

As shown in FIG. 1, the master information carriers 3 and 4 are like a disc in shape and comprises substrates 3a and 4a having irregularity patterns (e.g., servo signals) representing information to be transferred to the magnetic layers 2b and 2c of the magnetic recording media (slave media) and soft magnetic layers 3b and 4b provided along the irregularity patterns on the substrates 3a and 4a. The irregularity patterns respectively carried by the master information carriers 3 and 4 represent information to be transferred to the lower magnetic layer 2b and the upper magnetic layer 2c. By way of example, in the case of the master information carrier 3, the irregularity pattern is formed in the doughnut-like area circumscribed by the dashed line in FIG. 1.

The master information carriers 3 and 4 need not be limited to the structure of this embodiment. For example, the master information carriers 3 and 4 may comprise a substrate having thereon an irregularity pattern and a soft magnetic layer provided along only the top surfaces of the protruding portions of the irregularity pattern or a flat substrate having a flat surface and soft magnetic protruding portions formed on the flat surface in a pattern.

The substrate of the master information carrier may be formed, for instance, of nickel, silicon, a quartz plate, glass, aluminum, ceramics or synthetic resin. The soft magnetic layer may be formed, for instance, of Co, Co alloys (e.g., CoNi, CoNiZr and CoNbTaZr), Fe, Fe alloys (e.g., FeCo, FeCoNi, FeNiMo, FeAlSi, FeAl and FeTaN), Ni or Ni alloys (e.g., NiFe). As the material of the soft magnetic layer, FeCo and FeCoNi are especially preferable.

The substrate of the master information carrier having thereon the irregularity pattern or the pattern of the protruding portions can be formed, for instance, by the use of stamper method or photolithography.

The soft magnetic layer may be formed on the irregularity pattern by various vacuum film forming techniques or plating methods such as vacuum deposition, sputtering, ion plating and the like of magnetic material. The thickness of the soft magnetic layer is preferably 50 to 500 nm and more preferably 80 to 300 nm.

It is preferred that a protective film 5 to 30 nm thick such as of DLC (diamond-like carbon) be provided on the soft magnetic layer on the upper surface of the protruding portion. A lubricant layer may be further provided on the protective film. A reinforcement layer such as a Si layer may be provided between the soft magnetic layer and the protective film to enhance the contact therebetween. The lubricant layer suppresses deterioration in durability of the magnetic layer, such as scratches due to friction, which occurs in correcting for a shift generated when the magnetic layer is brought into contact with the slave medium.

Magnetic transfer of information to a slave medium (magnetic recording medium) in accordance with the present invention will be described with reference to FIGS. 2A to 2C, hereinbelow. In FIGS. 2A to 2C, only the lower magnetic layer 2b is shown.

An initial DC magnetic field Hin is first applied to the slave medium 2 in one direction parallel to the recording tracks thereof, thereby magnetizing the magnetic layer 2b of the slave medium 2 in an initial DC magnetization as shown in FIG. 2A. Thereafter, the magnetic layer 3b of the lower master information carrier 3 is brought into close contact with the lower magnetic layer 2b of the slave medium 2. In this state, a transfer magnetic field Hdu is applied in the direction opposite to the initial DC magnetic field Hin as shown in FIG. 2B, thereby magnetically transferring the information on the master information carrier 3 to the lower magnetic layer 2b of the slave medium 2. As a result, information represented by the irregularity pattern on the master information carrier 3 is transferred to the lower magnetic layer 2b as shown in FIG. 2C. The information represented by the irregularity patterns on a pair of master information carriers may be transferred to opposite sides of the slave medium either simultaneously or in sequence.

In the case where the irregularity pattern representing information to be transferred is a negative pattern reverse to the positive pattern shown in FIGS. 2A to 2C, the information can be magnetically transferred to the slave medium 2 by reversing the directions of the initial DC magnetic field Hin and the transfer magnetic field Hdu.

The intensities of the initial DC magnetic field and the transfer magnetic field are determined on the basis of the coercive force of the slave medium 2, the specific permeabilities of the master information carrier and the slave medium, and the like.

EXAMPLES

Flexible magnetic discs which satisfied the condition, that the magnetic layer consists of ferromagnetic powder which is not smaller than 158 kA/m (about 2000 Oe) in coercive force Hc(VSM) as measured by a vibrating sample magnetometer and is not larger than 100 in KuV/kT, (will be referred to as first to ninth embodiments (emb. 1 to emb. 9)) and which did not satisfy the condition (will be referred to as "first and second comparative examples (c/e. 1 and c/e. 2)" (the flexible magnetic disc of the first comparative example satisfied KuV/kT<100 but did not satisfy Hc(VSM) >158 kA/m, and the flexible magnetic disc of the second comparative example satisfied Hc(VSM)>158 kA/m but did not satisfy KuV/kT<100) were produced by the use of Ba-ferrite magnetic powder, signals were recorded on the flexible magnetic discs with a magnetic head and by magnetic transfer and SN1 and SN2 of signals reproduced from the flexible discs were measured.

Magnetic properties were measured by the use of a vibrating sample magnetometer (Touei Kogyou). The maximum magnetic field applied was 10 kOe(796 kA/m) and the observed time near the Hc was 10 seconds.

The anisotropy constant Ku was measured by the use of a torque magnetometer RTR-2 (Touei Kogyou). The value of rotational hysteresis loss Wr was measured applying to the erased sample a magnetic field whose intensity was gradually increased up to 10 kOe (796 kA/m), and the values of the rotational hysteresis loss were plotted versus a reciprocal (1/H) of the intensity of the applied magnetic field. An intensity of the magnetic field at which the rotational hysteresis loss Wr was 0 on the stronger magnetic field side was obtained by extrapolating a linear portion of the Wr curve and was taken as Hk. Then the anisotropy constant was calculated from formula $$Ku = Hk \times Ms/2$$

wherein Ms represents the saturation magnetization.

The SN1 was measured in the following manner. Signals of 150 kfci (flux change per inch) were recorded on the magnetic recording media at a distance of 22 mm from the center of the magnetic disc by the use of read/write analyzer RWA1601 (Guzik Co.) and Spin Stand LS90 (Kyodo Denshi System Co.) and an inductive/MR composite head which was 0.4 μm in the gap of the recording core, formed of Permalloy, 2 μm in the read track width, 0.25 μm in the sealed gap length. Then, reproduction output of the head amplifier was measured by a TR4171 Spectrum Analyzer (Advantest).

The SN2 was measured in the following manner. Signals of 150 kfci were recorded on the magnetic recording media by magnetic transfer. Then by the use of read/write analyzer RWA1601 (Guzik Co.), Spin Stand LS90 (Kyodo Denshi System Co.), an inductive/MR composite head which was 0.4 μm in the gap of the recording core, formed of Permalloy, 2 μm in the read track width, 0.25 μm in the sealed gap length and a TR4171 Spectrum Analyzer (Advantest), reproduction output of the head amplifier was measured in a position at a distance of 22 mm from the center of the magnetic disc.

The result was as shown in the following table 2.

S/N1 is 20 dB and it is possible to record a servo signal on the disc of the second comparative example with a magnetic head.

Thus, in the case of the magnetic recording media of the first to ninth embodiments, it is possible to form a satisfactory magnetization pattern by magnetic transfer though difficult with a magnetic head. Whereas, the magnetic recording medium of the first comparative example is suitable for recording a signal neither by magnetic transfer nor with a magnetic head. In the case of the magnetic recording medium of the second comparative example, it is possible to form a satisfactory magnetization pattern both by a magnetic transfer and with a magnetic head.

What is claimed is:

1. A flexible magnetic recording medium comprising a non-magnetic layer and a magnetic layer consisting of ferromagnetic powder dispersed in binder which are formed on a base sheet in this order, wherein the improvement comprises that the ferromagnetic powder is not smaller than 158 kA/m in coercive force Hc(VSM) as measured by a vibrating sample magnetometer and is not larger than 100 in KuV/kT (wherein Ku represents an anisotropy constant, V represents a volume, k represents a Boltzmann constant and T represents an absolute temperature) which is a parameter of thermal fluctuation, and a magnetization pattern representing predetermined information has been formed on the magnetic layer by magnetic transfer.

2. A flexible magnetic recording medium as defined claim 1 in which the ferromagnetic powder is ferromagnetic metal powder or ferromagnetic hexagonal ferrite powder.

TABLE 2

|  | dia. nm | thick. nm | V cm$^3$ | Hc kA/M | Ku J/m$^3$ | KuV/kT | Ra nm | φ m T · μm | S/N1 dB | S/N2 dB |
| --- | --- | --- | --- | --- | --- | --- | --- | --- | --- | --- |
| emb. 1 | 30 | 9 | $5.3 \times 10^{-18}$ | 198 | $6.8 \times 10^4$ | 86 | 2.5 | $2.5 \times 10^{-2}$ | 15 | 25 |
| emb. 2 | 26 | 8 | $3.5 \times 10^{-18}$ | 200 | $7.5 \times 10^4$ | 64 | 2.0 | $2 \times 10^{-2}$ | 14 | 27 |
| emb. 3 | 30 | 9 | $5.3 \times 10^{-18}$ | 198 | $6.8 \times 10^4$ | 86 | 2.8 | $2.4 \times 10^{-2}$ | 14 | 24 |
| emb. 4 | 30 | 9 | $5.3 \times 10^{-18}$ | 198 | $6.8 \times 10^4$ | 86 | 2.7 | $1.2 \times 10^{-2}$ | 16 | 25 |
| emb. 5 | 30 | 9 | $5.3 \times 10^{-18}$ | 198 | $6.8 \times 10^4$ | 86 | 2.0 | $4.5 \times 10^{-2}$ | 15 | 24 |
| emb. 6 | 30 | 9 | $5.3 \times 10^{-18}$ | 198 | $6.8 \times 10^4$ | 86 | 3.2 | $2.5 \times 10^{-2}$ | 13 | 20 |
| emb. 7 | 30 | 9 | $5.3 \times 10^{-18}$ | 198 | $6.8 \times 10^4$ | 86 | 1.8 | $5.3 \times 10^{-2}$ | 14 | 21 |
| emb. 8 | 42 | 10 | $1.1 \times 10^{-17}$ | 210 | $3.5 \times 10^4$ | 93 | 2.1 | $2.5 \times 10^{-2}$ | 14 | 20 |
| emb. 9 | 35 | 10 | $8.0 \times 10^{-18}$ | 276 | $0.9 \times 10^4$ | 17 | 2.0 | $2.5 \times 10^{-2}$ | 9 | 20 |
| c/e. 1 | 30 | 9 | $5.3 \times 10^{-18}$ | 142 | $6.0 \times 10^4$ | 76 | 2.4 | $2.6 \times 10^{-2}$ | 14 | 17 |
| c/e. 2 | 35 | 10 | $8.0 \times 10^{-18}$ | 201 | $6.2 \times 10^4$ | 119 | 2.8 | $2.5 \times 10^{-2}$ | 20 | 23 |

In table 2, dia. and thick. respectively mean the distance between opposed vertexes of the hexagonal system Ba-ferrite crystal and the thickness of the same.

As can be understood from table 2, in the case of the flexible discs of the first to ninth embodiments, the measured values of S/N2 were all not smaller than 20 dB though the measured values of S/N1 were all smaller than 20 dB. S/N not smaller than 20 dB is satisfactory for a reproduction signal of a servo signal. Whereas, in the case of the first comparative example, the measured values of S/N1 and S/N2 are both smaller than 20 dB, which means that the servo signal cannot be satisfactorily read out. In the case of the second comparative example, the measured value of 3. A flexible magnetic recording medium as defined claim 2 in which the magnetization pattern representing predetermined information is formed on the magnetic layer by magnetic transfer in which a transfer magnetic field is applied to the magnetic recording medium in close contact with a master information carrier provided thereon a magnetic layer pattern representing the predetermined information so that a magnetization pattern corresponding to the magnetic layer pattern is formed on the magnetic layer of the magnetic recording medium.

4. A flexible magnetic recording medium as defined claim 1 in which the magnetization pattern representing predetermined information is formed on the magnetic layer by magnetic transfer in which a transfer magnetic field is applied to the magnetic recording medium in close contact with a master information carrier provided thereon a magnetic layer pattern representing the predetermined information so that a magnetization pattern corresponding to the magnetic layer pattern is formed on the magnetic layer of the magnetic recording medium.

* * * * *